(12) United States Patent
Kvisteroey et al.

(10) Patent No.: US 6,236,005 B1
(45) Date of Patent: May 22, 2001

(54) MICROMECHANICAL ACCELERATION SWITCH

(75) Inventors: Terje Kvisteroey; Henrik Jakobsen; Gjermund Kittilsland; Asgeir Nord, all of Horten (NO)

(73) Assignee: Sensonor ASA, Horten (NO)

( * ) Notice: Subject to any disclaimer, the term of this patent is extended or adjusted under 35 U.S.C. 154(b) by 0 days.

(21) Appl. No.: 09/411,413

(22) Filed: Oct. 1, 1999

(51) Int. Cl.$^7$ .................................................. H01H 35/14
(52) U.S. Cl. ................ 200/61.45 R; 200/61.53; 200/61.45 M; 73/514.36
(58) Field of Search ................ 73/488, 514.01, 73/514.15, 514.16, 514.29, 514.35–514.38; 200/61.45 R–61.45 M

(56) References Cited

U.S. PATENT DOCUMENTS

| | | | |
|---|---|---|---|
| 5,177,331 | * 1/1993 | Rich et al. | 200/61.45 R |
| 5,220,835 | * 6/1993 | Stephan | 73/517 R |
| 5,591,910 | * 1/1997 | Lin | 73/514.38 |
| 5,804,783 | * 9/1998 | Breed | 200/61.45 R |
| 5,905,203 | * 5/1999 | Flach et al. | 73/514.32 |
| 5,927,143 | * 7/1999 | Cho et al. | 73/514.36 |
| 5,990,427 | * 11/1999 | Lammert et al. | 200/61.53 |

FOREIGN PATENT DOCUMENTS

| | | | |
|---|---|---|---|
| 4100451 | 7/1991 | (DE) | G01P/15/08 |
| 0442280 | 8/1991 | (EP) | G01C/19/56 |
| 0691542 | 1/1996 | (EP) | G01P/15/08 |

OTHER PUBLICATIONS

European Search Report dated Apr. 16, 1999.

* cited by examiner

Primary Examiner—Michael Friedhofer
(74) Attorney, Agent, or Firm—Andrus, Sceales, Starke & Sawall, LLP

(57) ABSTRACT

A micromechanical acceleration switch of silicon or similar materials, comprising a resilient electrode element, a proof mass, a housing and a spring element connecting the electrode element and the proof mass to the housing. The electrode element is mechanically connected adjacent to the proof mass. The proof mass has its centre of gravity located at a given distance from the axis through the spring element, so that when the proof mass is pivoting about the axis of the spring element in response to an externally applied acceleration, with a component in a direction parallel with the first axis. The electrode element also pivots about this axis. The pivot angle being essentially proportional to the magnitude of this component of the acceleration. The resilient electrode element has a mass considerably smaller than the proof mass, and is provided with at least one electrical contact point giving electrical contact and co-operation with corresponding contact areas in said switch housing at a given pivot angle of the electrode element.

29 Claims, 3 Drawing Sheets

(SECTION 2-2)

MICROMECHANICAL ACCELERATION SWITCH

BACKGROUND AND SUMMARY OF THE INVENTION

The present invention is related to a micromechanical acceleration switch of silicon or a similar material.

The invention is suitable for use in systems where one wants to detect when a predetermined acceleration is exceeded. Examples of applications are systems for activating air bags in cars or to turn off systems being subject to strong vibrations, which may be of interest in such different products as CD players, centrifuges and other rotating systems.

Presently, in relation to air bags, acceleration sensors, monitoring the acceleration of a vehicle all the time, and an acceleration switch, giving a signal when the acceleration exceeds a predetermined limit, are being used in combination. The acceleration switches are usually made mechanically so that a spring-loaded mass mounted in a reference system either breaks or makes contact when it is subject to acceleration of certain strength in relation to the reference system. This type of switches are simple, but are relatively large and expensive to manufacture.

Recently micromechanical devices working in a similar way have been described. Examples of these may be found in the patent publications EP-A-056084, U.S. Pat. No. 4,855,544, WO-A-96/21157 and WO-A-85/03383. In these a cantilevered beam is used, optionally with a proof mass element at one end. At a certain acceleration the beam is bent sufficiently to make an electrical contact and thus detect that the acceleration has exceeded a threshold. This threshold level will depend upon the physical parameters of the switch. The devices described in these publications have a number of disadvantages. The beams are provided with electrical conductors, which, because of the differences in thermal and elastic characteristics between the conductors and the material in the beams, make them sensitive to temperature variations. This is, however, mentioned in a somewhat different context in WOA-85/03383. The electrical conductors are also shown with relatively large contact surfaces, which limits the possibility for obtaining reliable operation and a low acceleration threshold level, because the electrostatic pulling force increases with the area.

A common feature for the above-mentioned publications is their sensitivity to vibrations which may cause oscillations of the beams at their resonant frequencies. An attempt to control damping has been made in U.S. Pat. No. 4,855,544 to avoid this by resting the beam against a plate positioned on the opposite side of the beam with respect to the direction of sensitivity. A system exploiting the resonant vibrations is described in EP-A567938, in which a number of beams have been used as described above, each beam being sensitive to different frequencies. In this way the vibration frequency of a system may be detected.

The threshold of the described switches will depend on the dimensions of the beams, and on the proof masses on their ends. This positioning of the proof masses determine, together with the spring constant of the beam, the dynamic range of the switch. When producing different switches with different thresholds, both the length of the beams and the size of the proof masses must be varied and one therefore has little flexibility in choosing the threshold. If a different threshold is wanted, considerable expense is incurred as a new switch will demand new masks and equipment for micromachining the different components. This reduces the possibilities for fine tuning of the switches during production and to limit the production costs, especially in specialised adaptions of components.

An improvement has bee-n described in EP-A-691542 wherein the proof mass is obtained by the asymmetric shape of an electrode element which is suspended by torsion springs attached to the substrate. Both contacting, non-contacting and feedback detection is described.

It is an object of the present invention to provide an acceleration switch which gives reliable and repeatable contact resistance, which is simple and cost effective in production and which may easily be adapted to different applications including use as bi-axial acceleration switches on the same chip.

According to the present invention, there is provided a micromechanical acceleration switch comprising:

an electrode element comprising at least one rod;
a proof mass;
a housing; and
a spring element connecting the electrode element and the proof mass to the housing, wherein the electrode element is mechanically connected adjacent to a proof mass, and wherein the spring element connects the electrode element and the proof mass with the housing so they can pivot, in use, about an axis, wherein:
  the at least one rod is flexible, providing a resilient contact between the contact points on the rods and contact areas in the housing; and
  the at least one rod has a mass considerably smaller than the proof mass, and is provided with at least one electrical contact point giving electrical contact in co-operation with corresponding contact areas in the switch housing at a predetermined pivot angle of the electrode element, in use; and
  the proof mass has its centre of gravity at a given distance from the axis through the spring element.

Generally, the geometrical dimensions of the acceleration switch may be changed based on well-known physical considerations to affect characteristics such as resonant frequency, damping coefficient and threshold, so that it may easily be designed for different applications.

In this way a switch is obtained having a dynamic range given by the size and position of the proof mass, while the threshold may be adjusted by the length of the rod and the distance between the axis through the spring element and the contact points.

Of particular significance for reliable operation is the contact force which needs to be greater than a certain value depending on the electrode materials and their method of fabrication.

In the present invention, the contact force is easily varied by changing the mass and the length of the rod as a function of the dimensions of the proof mass and the spring when the desired acceleration threshold is given. Also, the "sticking" force which opposes the breaking of contact between the electrode surfaces when the acceleration is reduced below the threshold value needs to be taken into account in order to obtain predictable performance. Separating the rod from the proof mass gives freedom in dimensioning this so that the contact force can be varied independently of the dimensions of the proof mass. The threshold of the switch may be made different in the up- and downwards directions by using two rods with different lengths and contact gap, and more than one switch may be made in the same switch housing to give sensitivity to different accelerations in the two directions and/or acceleration in different directions.

The rods may be provided, and may have flexible outer ends providing a resilient contact between the contact points on the rods and the contact areas in the house of the switch. This gives a damped movement which may contribute to avoid unwanted vibrations in the spring-loaded rod ("contact bounce"). Such vibrations may also be damped by filling the switch housing with a damping medium, preferably a viscous gas, and by giving the proof mass a flat shape thus providing an area perpendicular to its direction of movement. In this way the motion of the flat mass is dampened by the surrounding medium by squeeze film damping.

Cross axis sensitivity may be reduced by designing torsional springs with high aspect ratio (height/width/ratio>>1).

Furthermore, the resiliency of the rods gives rise to a wiping motion of the electrode surfaces with respect to one another when the contact opens and closes. This ensures a cleansing effect on the surfaces and contributes to reliable operation of the switch as evidenced by a stable value of contact resistance when the contact is closed even after very many contact operations.

The resilient contact elements allow incorporation of overload protection which limits the motion of the proof mass to pivot angles somewhat greater than the angle at which contact is made with the corresponding contact areas in the housing.

A further advantage of the present invention is that it allows provision of an accelerometer switch for detection of acceleration in a direction substantially in the plane of the substrate or frame. This also implies that one may construct monolithic acceleration switches for detecting acceleration along two orthogonal axes in the plane of the substrate. By this integration of functionality, the switches occupy a minimal area and they are therefore economical to produce and use.

BRIEF DESCRIPTION OF THE DRAWINGS

The invention will be described below with reference to the accompanying drawings, in which.

DETAILED DESCRIPTION OF THE INVENTION

Figure 1:
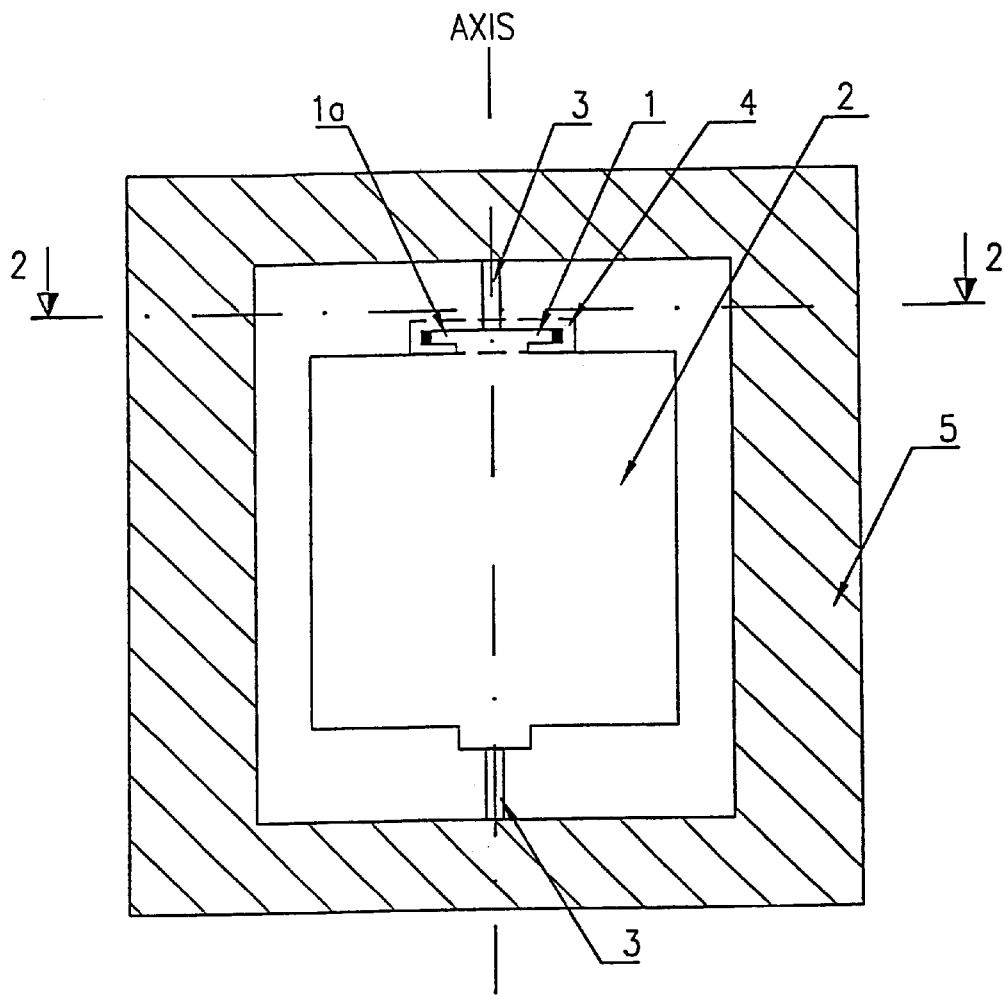
FIG. 1 is a plan view of an embodiment of the invention.

FIG. 1 shows an example of a switch according to the invention. The switch comprises a switch housing 5 which, via a torsion spring element 3, is connected to the electrode element 4. The electrode element 4 includes a thin rod 1 with an electrical contact point 6 in its outer end. A proof mass 2 is positioned with its center of gravity at a distance (a) from the pivot axis of the electrode element 4, which is defined by the spring element 3, shown in FIG. 2.

If the switch is subject to an accelerated motion with a direction component parallel to the axis of the electrode element 4, the proof mass 2 and the electrode element 4 will be pivoted about the axis of the spring 3, and the rod 1 will move towards or away from the housing surface. When the acceleration exceeds a certain limit, the contact point 6 will touch a corresponding contact area 7 in the house 5 of the switch (see FIGS. 2 and 3), so that an electrical signal may be provided to indicate that the predefined limit is exceeded.

In the switch illustrated in FIG. 1 the electrode element 4 is in addition optionally provided with a broader part, and there is another rod 1a positioned in the other end of the electrode element 4 which also may be provided with a contact point 6, providing a possibility for detecting acceleration in both directions along the same axis of sensitivity.

Figure 2:
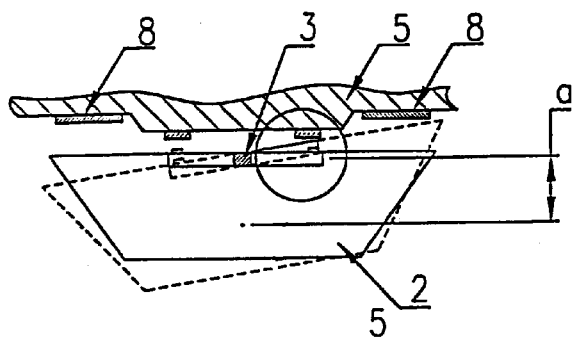
FIG. 2 is a cross-sectional view of the embodiment of FIG. 1.
Figure 3:
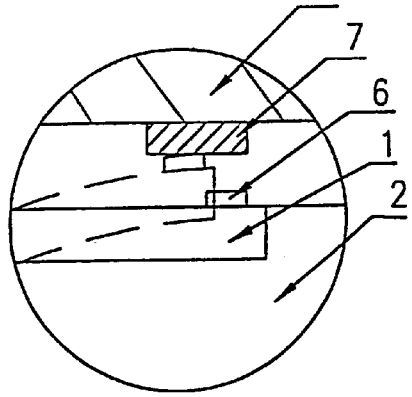
FIG. 3 shows a detail of a situation in which a contact point on a electrode element in the invention touches a contact area in a switch housing.

In FIGS. 2 and 3 a section of the switch is shown, as seen from the side. In these figures the electrode element 4 and the proof mass 2 are shown in a situation in which they are pivoted about the axis, and the contact point 6 on the rod 1 touches the contact area 7 in the upper part of the switch housing 5.

In the figures the upper part of the housing 5 is raised by using distance elements between the upper part of the housing 5 and the electrode element 4. In addition the upper part of the housing is recessed in order to provide room for the rod 1 and the proof mass 2 to move upwards. This may of course also be obtained by recess the upper part of the switch, or by a combination of recess both the upper part of the housing and the switch. The distance the contact point 6 moves when the switch is subject to an acceleration will necessarily depend upon the length of the rod 1, and thus the threshold of the switch may be regulated by adjusting this length. As the mass of the rod 1 is small compared to that of the proof mass 2, the threshold may easily be adjusted. The position of the contact area 7 in the upper part of the housing 5 will be the only change required when a different threshold of the switch is desired, if the contact areas 7 have already been given a sufficiently large extent to take into account changes in the length of the rod 1.

The switch shown in FIG. 2 is made of three layers. The middle layer will preferably be silicon, even if other materials in some cases may be suitable. The electrode element 4 and the proof mass 2 is micromachined from the same piece of material. The upper and the lower layer will preferably be made from glass, the electrical contact areas 7 and corresponding conductors being applied preferably by thin film deposition possibly in combination with plating processes.

The silicon layer also comprises necessary electrical conduction by doping the material. This last solution may be preferred if the rod 1 shall operate as an electrical conductor, so that the temperature dependence arising from the use of two different materials in the rod 1 is avoided.

In the preferred embodiment shown in the drawings the whole electrode element 4 and the spring element 3 is made in one plane and the proof mass 2 has a larger thickness.

Micromachining of this structure may be accomplished in a number of different ways, and this process is not essential to the invention. One example of a method may comprise the following steps:

a) Defining movable parts and frame by photolithography subsequent and diffusion of an n-type doping element into p-type silicon. Alternatively the n-layer can be epitaxially grown.

b) Wet etching from the back side to the p-n junction previously made by the diffusion and/or epitaxial growth in order to make a well or trench from the back, defining the thicknesses of the torsional springs 3 and the arms.

c) Freeing of the movable parts by selective, photolithographically masked ion etching from the front.

After this the contact points 6 may be defined near the end of the rod or rods 1,1a and any desired conducting paths or circuits may be doped into the silicon. The contact points 6 and areas 7 may be made of gold or other materials with sufficiently good conducting and contact characteristics.

In FIGS. 1 and 2 the proof mass 2 is shaped as a relatively large, thick disc. This gives, in addition to a simple production procedure, an additional advantage. If the room surrounding the electrode element 4 is filled with a gas, or possibly a liquid, a movement of the proof mass 2 will meet resistance because it has to displace the surrounding medium. This gives a damping of oscillations in the electrode element 4. The cavity formed by the housing 5 may be hermetically sealed or simply be ventilated to the surroundings, so that the gas in the cavity is air. Different intermediate solutions are also possible, e.g. the so called "squeezefilm" damping where the gas is pressed out through small fissures.

FIG. 3 illustrates a detail of the rod 1 and the upper part of the switch housing 5 in which the contact point 6 of the rod 1 and the contact area 7 of the housing touch each other. In the figure it is also indicated that the rod 1 is bent when it is forced against the contact area 7 by the movement of the proof mass 2. This bending causes a wiping motion of the contact area 7. The resiliency of the rod 1 also attenuates vibrations and prevents the electrode element 4 from "bouncing" back.

Figure 4A:
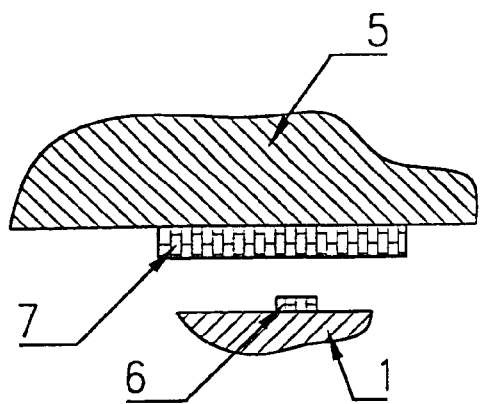
FIGS. 4A–4C show different configurations of contact points on the rod and corresponding areas in the switch housing.
Figure 4B:
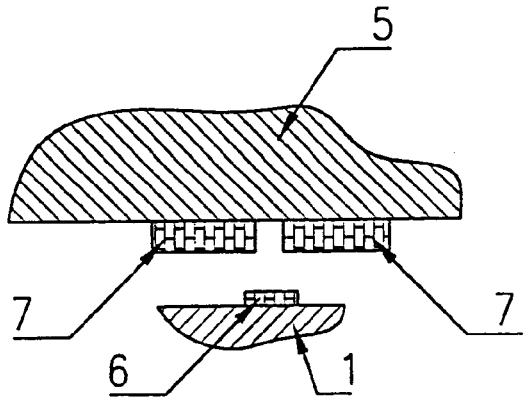
Figure 4C:
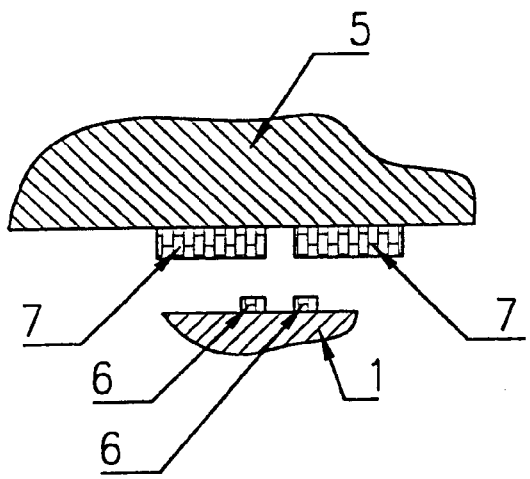

In FIGS. 4A–C different types of contacts 6,7 between the switch housing 5 and the rod 1 are shown. The simplest is shown in FIG. 4A, where an electrical contact is made between a contact point 6 on the rod 1 and a corresponding contact area 7 in the housing 5. FIG. 4B shows an embodiment in which the contact point 6 provides a connection between two contact areas 7, both being positioned in the housing 5. FIG. 4C shows a similar solution comprising two contact points 6, each providing connection with a contact area 7 in the switch housing 5.

The preferred implementation depends on the desired functionality. The solution in FIG. 4A requires that the rod 1 includes electrical conductors, which may, as mentioned above, be obtained by doping the material of which the rod 1 is made. Compared to metal the doped silicon has, however, relatively poor conductivity. The advantage with this solution is that the contact surface between the conductors is small.

FIGS. 4B and 4C indicate a shunt solution in which the contact point(s) 6 provide(s) electrical connection between two electrical conductors both positioned in the switch housing 5. In FIG. 4B the contact point 6 has a relatively large surface, therefore the force needed to make a good connection is correspondingly larger. This problem is solved in FIG. 4C, which shows two contact points 6 which combined only have twice the surface of one contact point 6, but in this case the rod 1 is used as a conductor. Intermediate solutions between these embodiments may of course be constructed, in which conductors are provided between the contact points 6 using doping or a thin metal conductor.

Figure 5:
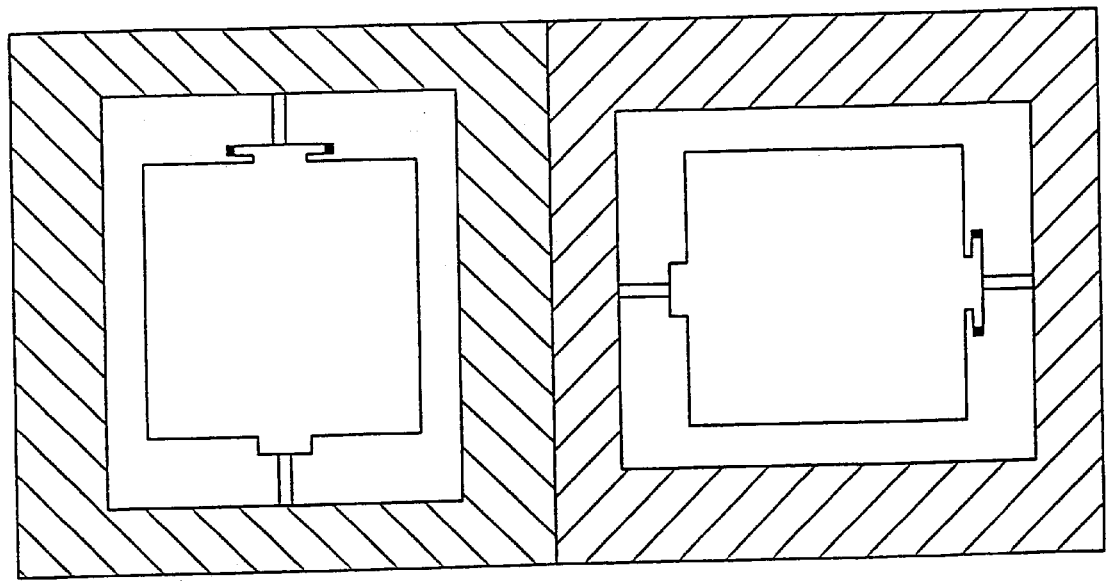
FIG. 5 illustrates a bi-axial acceleration switch employing the present invention.

FIG. 5 illustrates a bi-axial acceleration switch on a single chip. The axis of the second switch is substantially normal to the axis of the first switch. By this construction it is possible to detect acceleration in two orthogonal directions.

Figure 6:
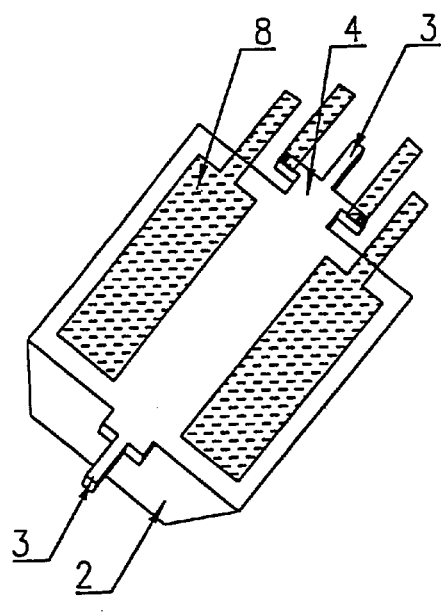
FIG. 6 illustrates a three-dimensional switch comprising self-test electrodes.

FIG. 6 illustrates the acceleration switch in three dimensions.

In an alternative embodiment a voltage may be applied between the contact area 8 and the corresponding electrodes on the proof mass, not shown in the figures, or optionally between the contact point 6 and the contact area 7, electrostatically forcing the contacts together in the absence of an externally applied accelerating motion. If this switch is subject to an acceleration above a given limit, the connection between the contacts is disrupted. This limit is set by the applied voltage. In this way the threshold of the switch may be selected electronically, and thus be adjusted within a range defined by the system.

Applying an electrostatic force in this manner may also be used to test the switch. The electrodes 8 used for applying voltage are shown in FIG. 2 and 6.

What is claimed is:

1. A micromechanical acceleration switch comprising:
    an electrode element comprising at least one rod;
    a proof mass;
    a housing; and
    a spring element connecting the electrode element and the proof mass to the housing, wherein the electrode element is mechanically connected adjacent to the proof mass, and wherein the spring element connects the electrode element and the proof mass with the housing so the electrode element and the proof mass can pivot, in use, about an axis, wherein:
        the at least one rod includes a contact point and is flexible so as to provide a resilient contact between the contact point on the at least one rod and at least one contact area located on the housing at a predetermined pivot angle of the electrode element;
        the at least one rod has a mass considerably smaller than the proof mass; and
        the proof mass has a centre of gravity located at a given distance from the axis through the spring element.

2. A switch according to claim 1 formed from silicon.

3. A switch according to claim 2 formed from single crystal silicon.

4. A switch according to claim 2 formed from poly-silicon or a combination of poly silicon layers and single crystal silicon.

5. An acceleration switch according to claim 1, wherein the at least one rod of the electrode element is resilient.

6. An acceleration switch according to claim 1, wherein the at least one rod of the electrode element comprises two rods mechanically connected adjacent to the proof mass.

7. An acceleration switch according to claim 6, wherein each rod includes at least one electrical contact point and wherein the housing includes a pair of contact areas, each of which makes electrical contact with one of the contact points at a predetermined pivot angle of the electrode element.

8. An acceleration switch according to claim 1, wherein the housing includes two contact areas and wherein the at least one rod is provided with the at least one contact point which is located so as to provide an electrical connection between the two contact areas, wherein the two contact areas have corresponding positions in said housing, at a given pivot angle of the electrode element.

9. An acceleration switch according to claim 1, wherein the at least one rod is provided with one contact point at an outermost end co-operating with the contact area in said housing, and wherein the rod is an electrical conductor.

10. An acceleration switch according to claim 1, wherein the spring element is a torsion spring formed as a beam extending along the axis.

11. An acceleration switch according to claim 1, further comprising means for applying a voltage, in use, between the contact point on the rod and the contact area on the housing, said voltage providing a force, to obtain or prevent contact between said contact point on the rod and the contact area located on the housing by regulating said voltage.

12. An acceleration switch according to claim 1, wherein the proof mass further comprises an electrode and a means for applying a voltage between said electrode on the proof mass and a contact area (8) on the housing, to self-test the switch, electrostatically forcing the contact point and the contact area together when an externally applied accelerating motion is not present.

13. An acceleration switch according to claim 1, wherein the housing comprises at least two layers, the first layer having the spring element, electrode element and the proof mass mounted thereon and the second layer consisting of glass or equivalent materials and including the electrical contact areas.

14. An acceleration switch according to claim 13, wherein said first layer of the housing, the electrode element, the spring element and the proof mass are made from one piece of material.

15. An acceleration switch according to claim 1, wherein the switch housing is filled with damping medium and the proof mass has a flat shape to provide squeeze film damping.

16. An acceleration switch according to claim 15, wherein the damping medium is a viscous gas.

17. A bi-axial monolithic acceleration switch, comprising two switches according to claim 1, wherein the axis on the second switch is substantially normal to the axis of the first switch.

18. An acceleration switch according to claim 1, further comprising means for applying a voltage between an electrode on the proof mass and a contact area (8) on the housing, said voltage providing a force, to obtain or prevent contact between the electrode on the proof mass and the contact area (8) on the housing.

19. An acceleration switch according to claim 1, further comprising means for applying a voltage between the contact point on the rod and the contact area on the housing, to self-test the switch, electrostatically forcing the contact point and the contact area together when an externally applied accelerating motion is not present.

20. An acceleration switch comprising:
   an electrode element;
   a proof mass;
   a housing; and
   a spring element connecting the electrode element and the proof mass to the housing, wherein the electrode element is interconnected between the proof mass and the spring element, and wherein the spring element connects the electrode element and the proof mass with the housing so that the electrode element and the proof mass can pivot, in use, about an axis.

21. An acceleration switch according to claim 20, wherein the axis extends through the spring elements, and wherein the proof mass has a center of gravity located at a given distance from the axis through the spring element.

22. An acceleration switch according to claim 21, wherein the electrode element further comprises at least one rod connected adjacent the proof mass.

23. An acceleration switch according to claim 22, wherein the at least one rod is resilient and has a contact point allowing an electrical connection with a contact area located on the housing, the contact area having a corresponding position on said housing, at a given pivot angle of the electrode element.

24. An acceleration switch according to claim 23, further comprising means for applying a voltage between the contact point on the rod and the contact area on the housing, said voltage providing a force, to obtain or prevent contact between said contact point on the rod and the contact area located on the housing by regulating said voltage.

25. An acceleration switch according to claim 22, wherein the at least one rod has a mass considerably smaller than the proof mass.

26. An acceleration switch according to claim 20, wherein the axis extends through the spring element and the proof mass has a center of gravity located at a given distance from the axis.

27. An acceleration switch according to claim 20, wherein the proof mass further comprises an electrode and a means for applying a voltage between said electrode on the proof mass and a contact area (8) on the housing, to self-test the switch, electrostatically forcing the electrode and the contact area (8) together when an externally applied accelerating motion is not present.

28. An acceleration switch according to claim 20, wherein the housing is filled with a damping medium and the proof mass has a flat shape to provide squeeze film damping.

29. A bi-axial monolithic acceleration switch, comprising two switches according to claim 20, wherein the axis on the second switch is substantially normal to the axis of the first switch.

* * * * *